Dec. 13, 1955 W. C. BEE 2,726,753
BARREL STORAGE SYSTEM
Filed Jan. 23, 1952 7 Sheets-Sheet 2

INVENTOR.
William C. Bee.
BY
Harness, Dickey & Pierce
ATTORNEYS.

Dec. 13, 1955  W. C. BEE  2,726,753
BARREL STORAGE SYSTEM
Filed Jan. 23, 1952  7 Sheets-Sheet 3

INVENTOR.
William C. Bee.
BY
Harness, Dickey & Pierce
ATTORNEYS.

Dec. 13, 1955  W. C. BEE  2,726,753
BARREL STORAGE SYSTEM
Filed Jan. 23, 1952  7 Sheets-Sheet 6

INVENTOR.
William C. Bee.
BY
Harness, Dickey & Pierce
ATTORNEYS.

United States Patent Office 2,726,753
Patented Dec. 13, 1955

2,726,753

BARREL STORAGE SYSTEM

William C. Bee, Bloomfield Hills, Mich., assignor to Palmer-Bee Company, Detroit, Mich., a corporation of Michigan Application January 23, 1952, Serial No. 267,895

4 Claims. (Cl. 198—84)

This invention relates to barrel storage systems, and more particularly to a purely mechanical system for receiving and storing quantities of barrels and withdrawing the barrels from storage as needed, so that no manual handling is required after the barrels are delivered to the receiving end of the system.

In the past, difficulty has been encountered in devising a system for receiving and storing barrels or drums in such locations as chemical plants where the barrels are re-used and develop dents and irregularities, the quantity of empty barrels to be stored will vary greatly with time, and the need for withdrawal of the barrels from storage will also fluctuate. Previously known systems for handling and storing these barrels have necessitated the use of large storage areas and have involved the unloading and moving of the barrels by manpower and auxiliary lifting devices, so that only a few barrels could be handled at a time. It is common practice to move barrels by rolling them under manual guidance. However, due to irregularities in barrels, which are aggravated after they have been used, it has been found impractical to provide mechanical means for rolling barrels. Furthermore, systems used heretofore have not been flexible enough to accommodate the greatly varying quantities of barrels to be stored, or to allow the storage capacity to be independent of the discharge rate.

It is an object of the present invention to overcome the disadvantages of previously known barrel storage systems, and to provide a system which greatly reduces the storage space and handling required by maximum utilization of the available storage volume.

Other objects are to provide a system of the above character which is extremely flexible in construction and operation; to provide a system built up in multiple units which can be added to at will to enlarge the system capacity, the units being operable independently while remaining part of the complete system; and to provide a continuous system for dispatching the barrels from receiving to storage and from storage to loading stations in such manner that the delivery rate to the loading stations is entirely independent of the delivery rate to the storage system.

It is also an object to provide an improved barrel storage system of the above nature which is relatively inexpensive to fabricate and in which the loading, transfer and discharge portions of the system are positive in operation and may be either automatically or manually controlled.

Other objects, features, and advantages of the present invention will become apparent from the subsequent description, taken in conjunction with the accompanying drawings.

Figure 1:
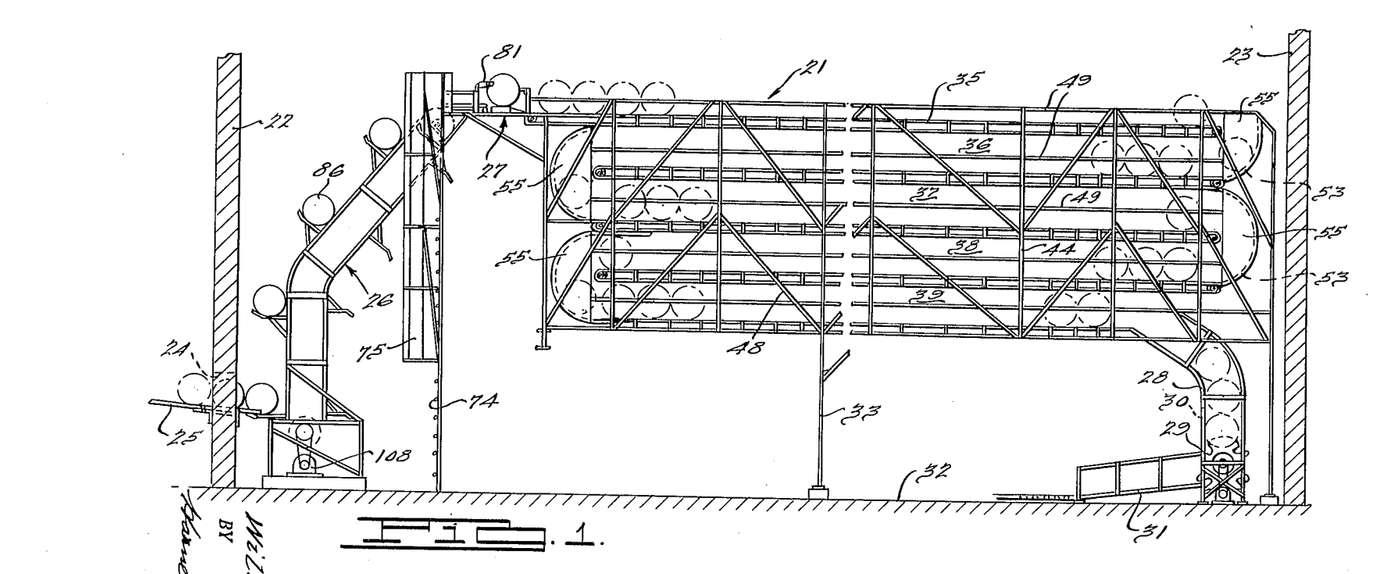
Figure 1 is a general view in elevation of the barrel storage system, showing the barrel elevator, the feed conveyor, the section tiers of one storage rack unit, and the discharge arrangement.
Figure 2:
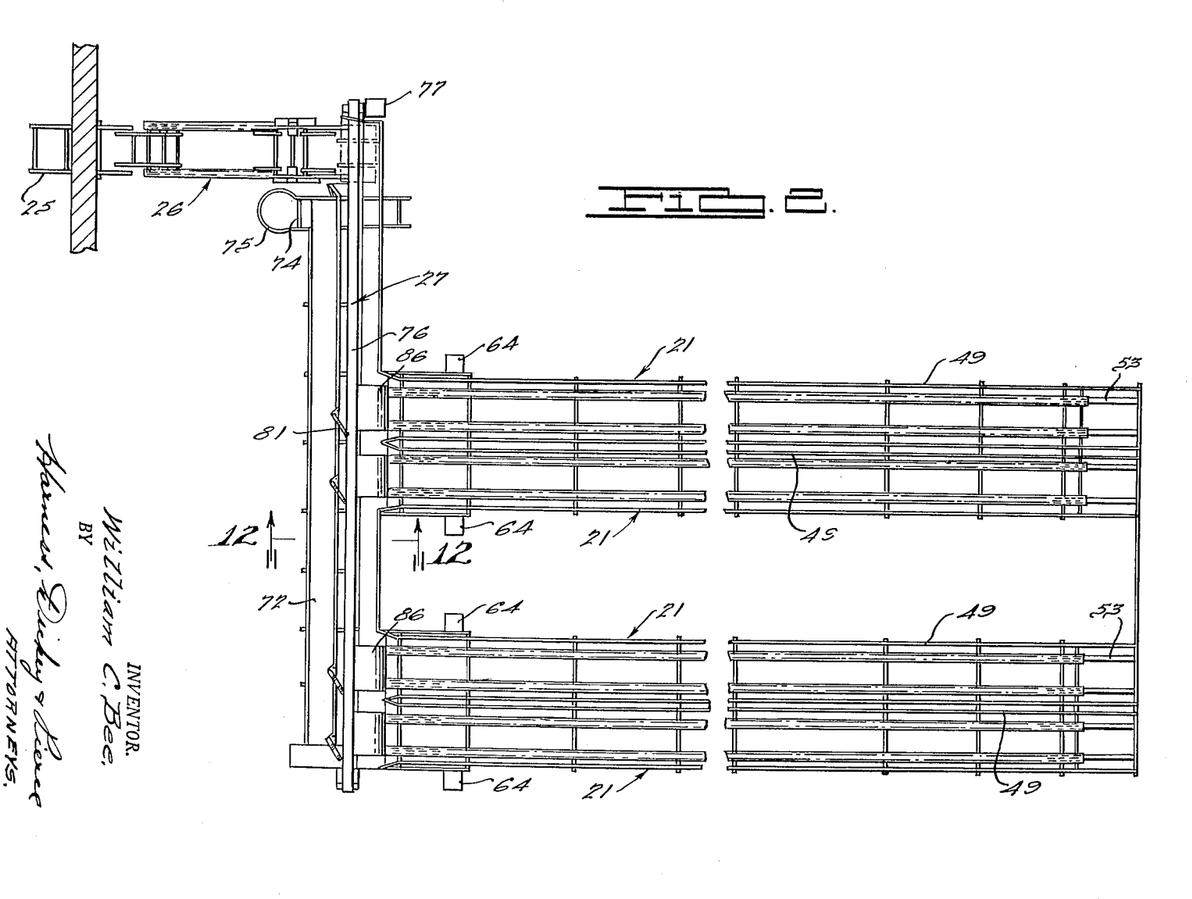
Figure 2 is a general plan view of the system showing four rack units of the storage arrangement, as well as the feed conveyor and the barrel deflecting means.

The invention comprises a plurality of storage racks generally indicated at 21 which are adapted to receive, store and discharge cylindrical containers such as drums or barrels which are received in an empty condition at a chemical plant and are to be held for an indefinite period before being used. These storage racks 21 may for the purpose of the invention comprise single units or as shown in the illustrated embodiment, be built up in groups of two, these groups being spaced apart as shown in Figure 2. The rack units are adapted to be installed either indoors or outdoors, and are shown as being enclosed within a housing structure having walls 22 and 23. Barrels are received through an opening 24 in wall 23 along a ramp 25 and are carried by an elevator generally indicated at 26 to the storage racks. In particular, the elevator is adapted to lift the barrels onto a transfer or feed conveyor generally indicated at 27, the feed conveyor carrying the barrels to any selected one of the storage racks 21. The barrels are stored in the storage racks until needed, when they may be removed through a discharge section 28 to a controlled discharge mechanism such as a conventional star wheel device shown schematically at 29, so that the barrels may be removed at a controlled rate through an opening 30 in the discharge section to an unloading platform 31.

Figure 3:
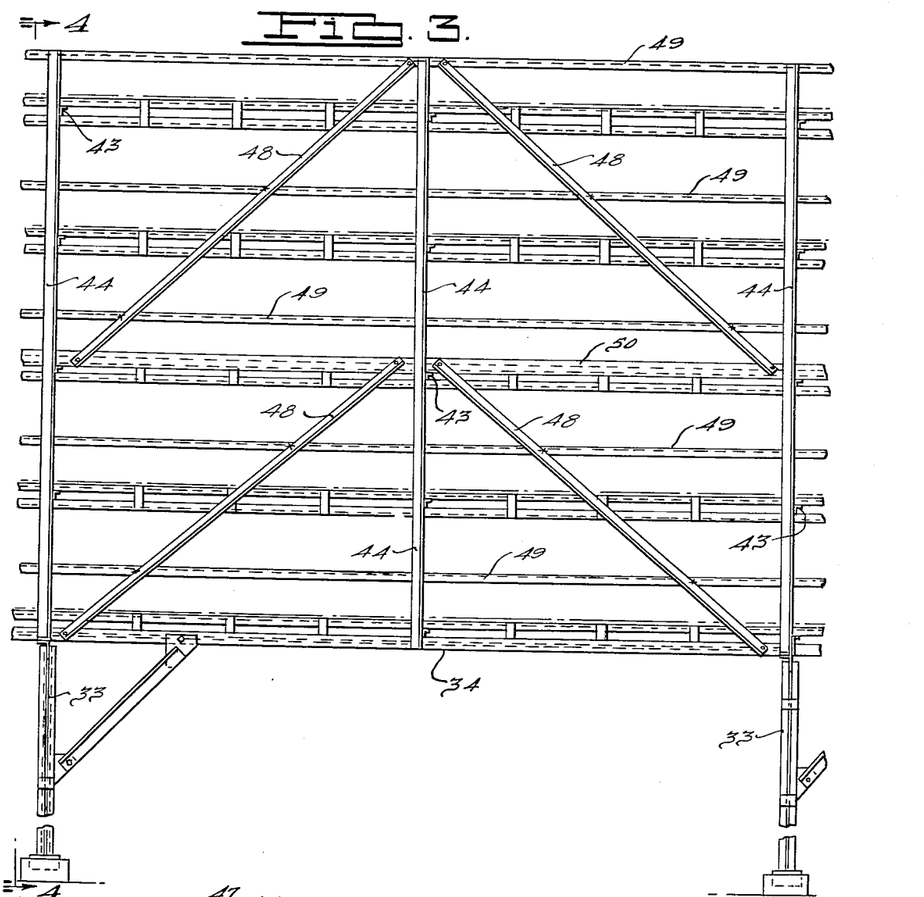
Figure 3 is a fragmentary elevational view showing the structural details of one storage rack unit.
Figure 4:
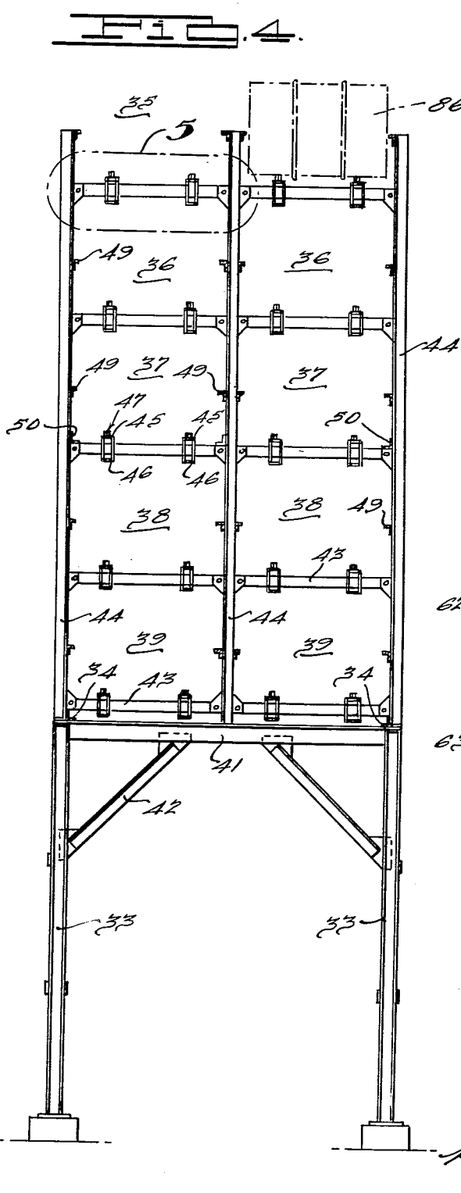
Figure 4 is a cross-sectional view taken along the line 4—4 of Figure 3, and showing the disposition and supporting structure of the storage tiers.

The storage rack structure is best illustrated in Figures 1 to 4, the racks being supported above the floor 32 by means of a plurality of columns 33 and beams 34. Each storage rack is composed of a plurality of tiers, five tiers being shown in the illustrated embodiment and being numbered 35, 36, 37, 38 and 39 in order of decreasing height. It will be understood however that the principles of the invention could be carried out with storage racks having a different number of tiers depending on the storage capacity requirements. These tiers, which are slightly wider than the barrel height, may be of any desired length to accommodate the required number of barrels when lying side by side. The tiers are supported in spaced-apart relationship by a supporting structure shown best in Figures 3 and 4. This supporting structure comprises a plurality of cross beams 41 supported by columns 33 together with diagonal struts 42, and a plurality of transverse tier supports 43 secured between spaced uprights 44. These uprights 44 are supported by longitudinal beams 34 and are of a height sufficient to support the five tiers. The uprights may be longitudinally spaced as shown in Figure 3 at half the distance between columns 33, alternate uprights being aligned with the columns. The tier supports 43 each hold upper and lower chain guides 45 and 46 which, as described later, support and guide the endless chains 47 used in each tier. Diagonal braces 48 are secured between beams 34, longitudinal guide rails 49 and intermediate beams 50. The guide rails are so spaced that they prevent the barrels from cocking to a locking angle during movement. Beams 50 lend further support to uprights 44.

Figure 5:
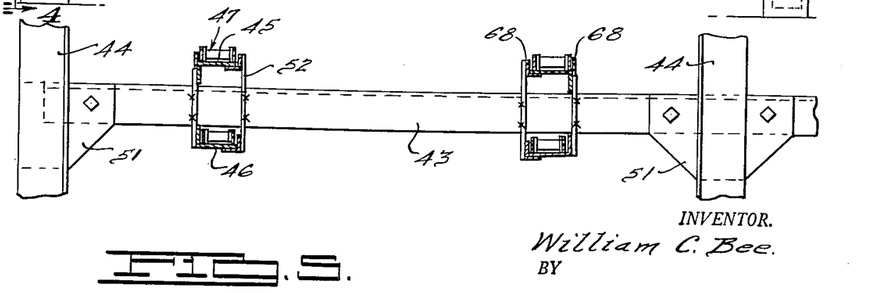
Figure 5 is a fragmentary view within the area 5 of Figure 4 and showing the endless chain supporting structure of the rack.

As shown in detail in Figure 5, the tier supports 43 are secured by gusset plates 51 to the uprights 44, and two parallel sets of chain supports are held by each row of tier supports and form the tier bed. The upper chain support 45 and the lower chain support 46 of each set are held in spaced-apart relationship by vertical brackets 52, and the arrangement is such that the chain supports are spaced inwardly from the uprights 44 a sufficient distance to enable the chains 47 to engage the cylindrical surface of the barrel. Furthermore, the upper chain support 45 holds the upper run of the chain a substantial distance above the tier supports 43, while the lower run of the chain is below the tier supports.

Figure 8:
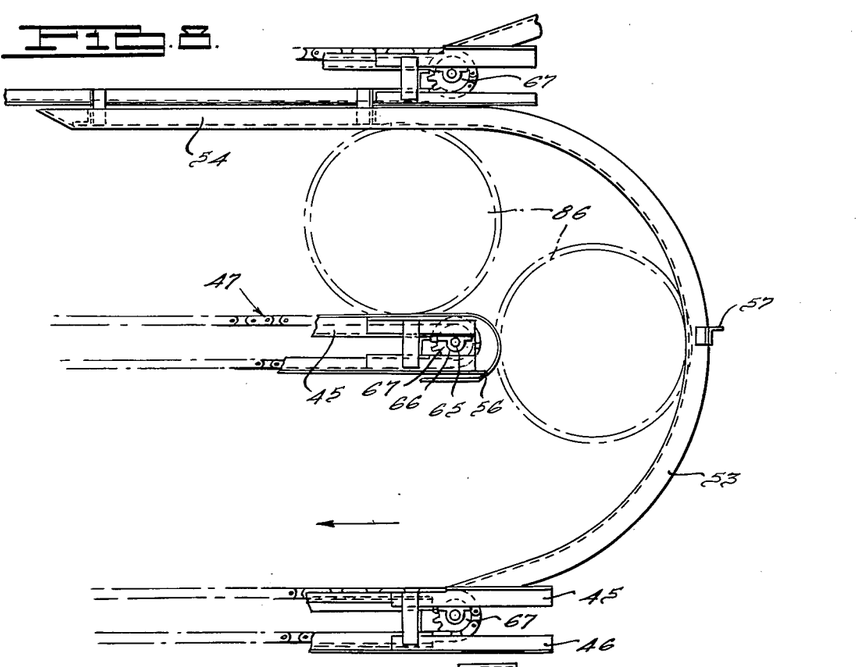
Figure 8 is an elevational view of the barrel drop structure between adjacent tiers.

As is described later, the system is adapted to feed the barrels onto the uppermost tiers 35 of the rack units, and means are provided in each rack unit for transferring the barrels from the uppermost tier down to the tier 36 and from there to the succeeding tiers, 37, 38 and 39. This means preferably comprises a plurality of curved guide rails 53 which are shown in detail in Figure 8 and are disposed at alternate ends of the tiers. The guide rails are arcuate in form covering approximately 180°, these arcs being centered on the end portions of their corresponding chain supports. The guide rails are in the planes of the chain supports and preferably have extensions 54 with tapered ends to receive the barrels as they near the ends of the tiers. A pair of vertically disposed guide plates 55 conforming in outline to the curved guide rails 53 serve to enclose the area adjacent each pair of guide rails, these guide plates being in the plane of guides 49 and serving to prevent cocking of the barrels during their drop. As the barrels are carried over the tier ends by chains 47 they will drop between the rails 53 and curved guards 56 on the chain support ends, the spacing between these points being slightly greater than the barrel diameter, and the barrels will thus drop smoothly onto the chains of the next tier as shown by the arrow in Figure 8. One or more cross braces 57 may be provided between the curved rails 53 for strengthening purposes, these cross braces also serving to support guide plates 55. It will be observed that the rails 53 leading from the uppermost tier 35 to tier 36 are arced only 90° since there is no structure above tier 35.

Figures 6, 7:
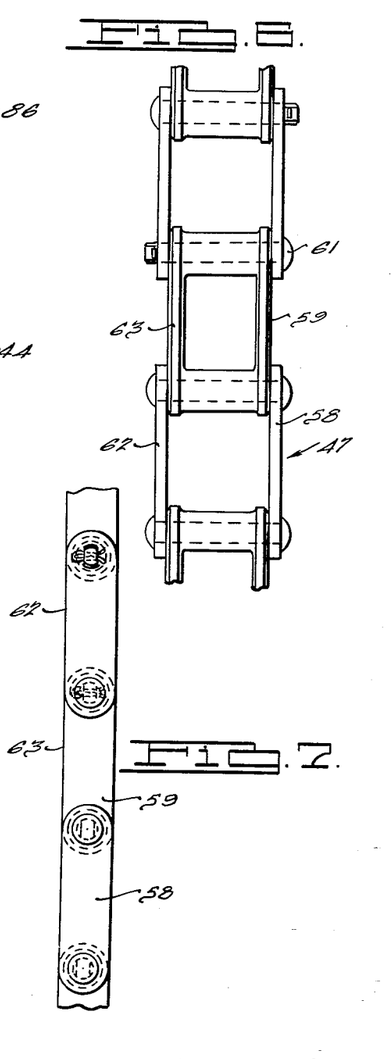
Figure 6 is a detail plan view of a section of the endless chain.
Figure 7 is a side elevational view of the chain showing the link connections.

The means for moving barrels along each tier preferably comprises chains 47, which are shown in detail in Figures 6 and 7 and comprise a plurality of links 58 and 59 joined by pins 61. The chain may be of any conventional construction but is preferably such that the edge surfaces 62 of links 58 and the edge surfaces 63 of links 59 are in a single plane, as shown in Figure 7. It will thus be seen that the chains may be driven continuously while the barrels are stationary without undue friction occurring, especially since the chains and barrels have only a small contact area. The chains of uppermost tier 35 are driven in such manner that the upper runs of the chains travel away from feed conveyor 27, and chains of successive tiers run in opposite directions. The chains are driven by any desired arrangement such as electric motors and reduction gears 64, shown in Figure 2, the illustrated embodiment showing an individual driving unit for each pair of endless chains in each rack unit. These motors are connected to sprocket shafts 65 which are held by bearings 66 secured to the undersides of chain supports 45 at the opposite ends of these supports. Sprockets 67 are supported by the shafts 65 between the upper and lower chain supports so that the endless chains may be continuously driven by their power means. It will be seen in Figure 5 that the chain supports are so constructed that the upper surface of the upper run of each chain is spaced substantially above the side edges 68 of its chain support, so that the barrels will clear the chain supports without any scraping action occurring.

Figure 12:
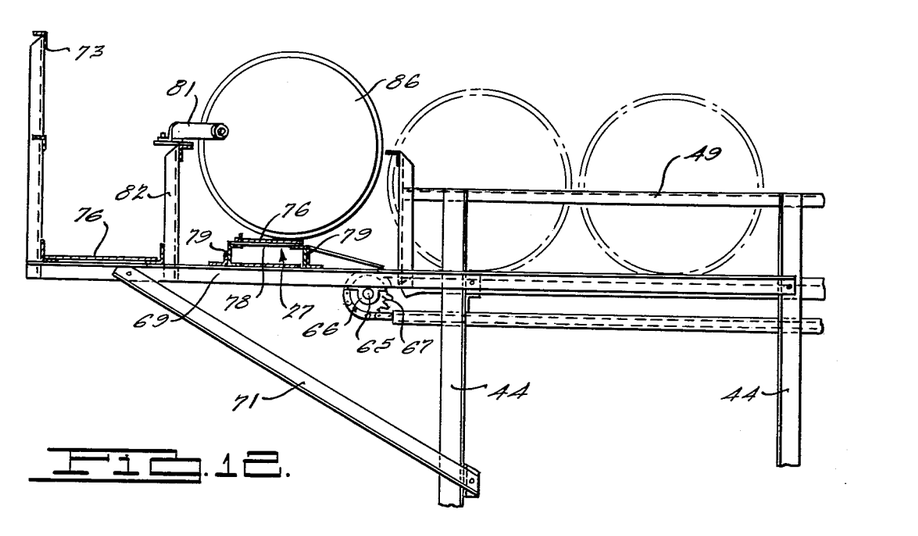
Figure 12 is a cross-sectional view taken along the line 12—12 of Figure 2 and showing the feed conveyor supporting structure as well as the deflecting means for moving the barrels into the storage rack.
Figure 13:
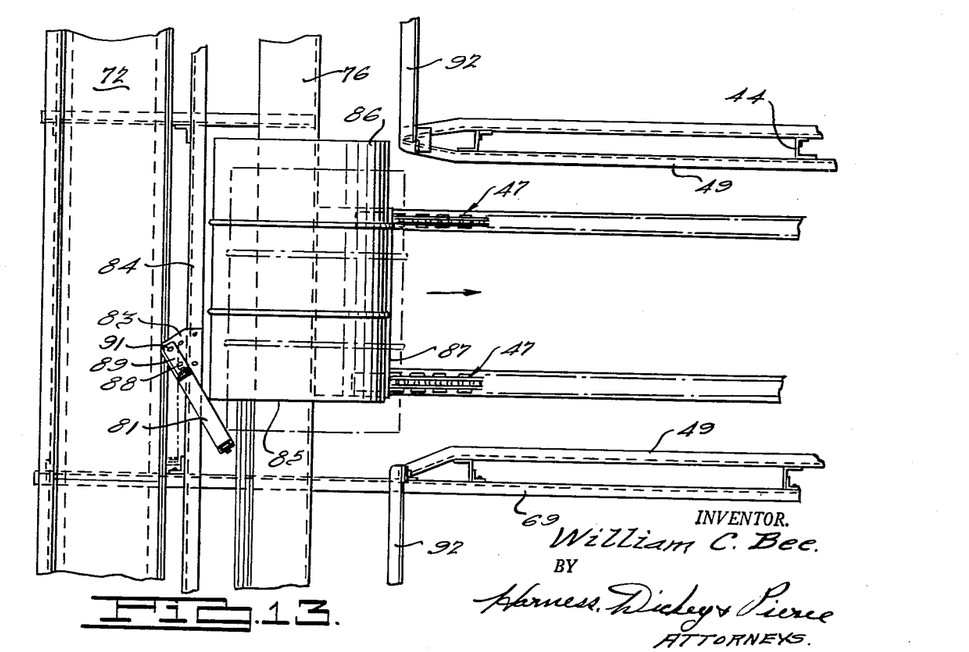
Figure 13 is a plan view of a portion of the feed conveyor supporting structure showing the mounting means for the deflectors.

While the lengths of tiers 36 to 39 are approximately equal, that of uppermost tier 35 is somewhat longer than the others in order to connect with feed conveyor 27 which is shown most clearly in Figures 2, 12 and 13. Preferably, this conveyor is supported by beams 69 secured to the upper ends of uprights 44 at one end of each rack unit 21 and extending to the left as seen in Figure 12. These beams, which are strengthened by diagonal braces 71, may support a catwalk 72 outwardly of the conveyor 27, this catwalk being provided to facilitate control of the storage as will be seen later. The catwalk 72 is preferably provided with a guard rail 73 and an access ladder 74 having a guard 75, as shown in Figure 2.

The conveyor 27 comprises an endless belt 76 extending across the ends of the storage rack units 21 and driven by a motor and reduction gear 77. The upper run of the belt is supported by a bed plate 78 spaced above beams 69 by supports 79, and the belt running on pulleys 80 is of sufficient width to carry thereon barrels which are lying on their sides with their axes parallel to the belt. At spaced positions adjacent this belt are a plurality of deflecting members 81 which are spaced above the belt 76 by standards 82. These deflectors 81 may comprise rollers which are held in inclined relation with the belt axis by means of brackets 83 secured to a supporting rail 84 which in turn is held by standards 82. The deflectors are disposed opposite the ends of the uppermost tiers 35 and in particular are so placed that when in their inclined position, as seen in solid lines in Figure 13, the foremost edge 85 of an approaching barrel 86 will strike the roller, and the barrel will be moved from its solid-line position in Figure 13 to its dot-dash position, barrel edge 85 running on the roller. An inclined ramp or floor plate 87 is disposed between the entrance to each upper tier and adjacent portion of conveyor 27, so that when the barrel is moved by deflector 81 it will roll onto ramp 87 and be carried between the flared ends of guides 49 to the moving chains 47 of the upper tier.

Means are provided for retracting any of the deflectors 81 from their inclined position, and such means may comprise for example a removable pin 88 for each deflector positioning bracket 89, so that this bracket may swing about a pivot pin 91 into its double dot-dash position of Figure 13. When in this position, the deflector will be out of the path of barrels 86 as they are carried along by the conveyor. The supporting rails 84 will also act as guide rails for the barrels, and additional guide rails 92 are provided on the opposite side of the conveyor 27 between adjacent tiers, the spacing between these guide rails being slightly greater than the barrel diameter. It will be understood that other means could be provided for shifting deflectors 81 between their inclined and retracted positions, and that this means could if desired be controlled from the ground level.

Figures 9, 10:
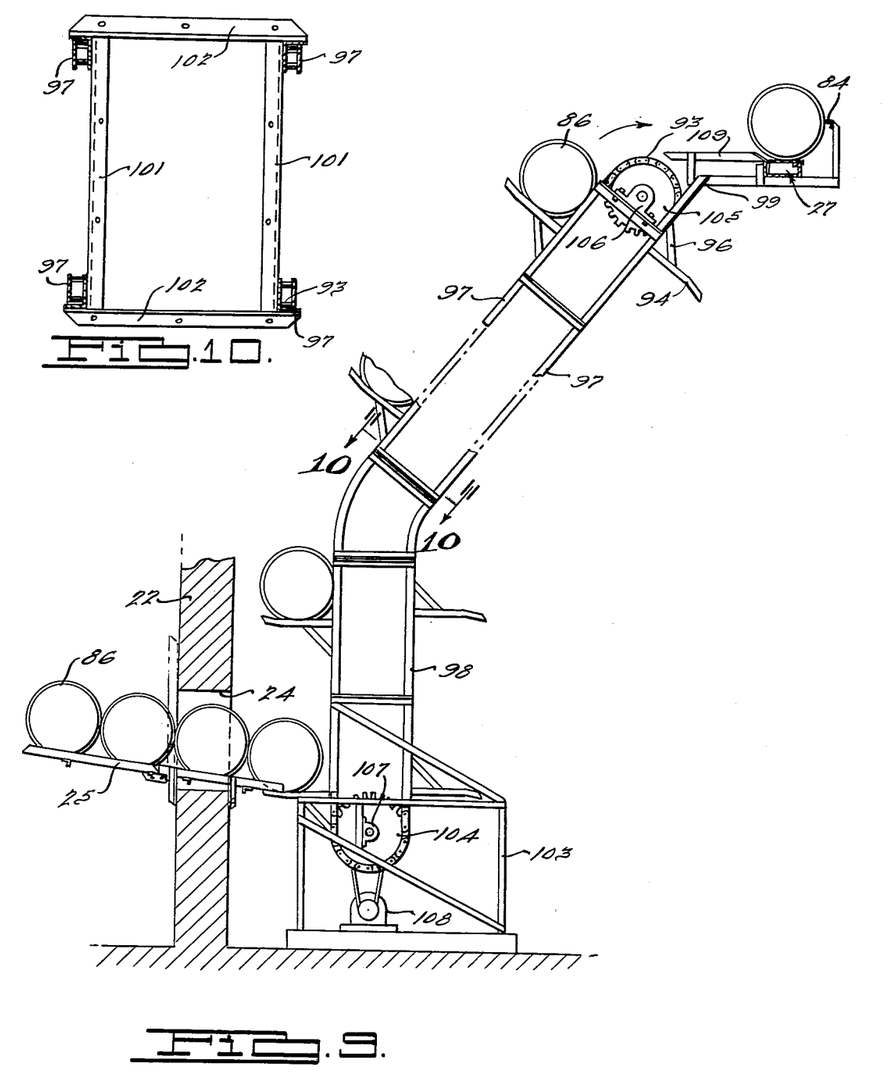
Figure 9 is an elevational view of the barrel elevator showing its relation to the receiving ramp.
Figure 10 is a cross-sectional view taken along the line 10—10 of Figure 9 and showing the frame structure of the elevator.

As seen in Figure 2, the conveyor 27 at one end may extend beyond the rack units, and the elevator 26 for carrying the barrels onto the conveyor is preferably disposed at this remote end of the conveyor. The elevator may be of any desired nature and in the illustrated embodiment comprises an endless chain 93 having a plurality of pairs of lifting arms 94 which may be connected by a cross piece 95 and supported by diagonal braces 96. This conveyor lift runs on a pair of spaced rails 97 which have lower vertical portions 98 and upper inclined portions connected at 99 to the supporting frame structure for conveyor 27. Rails 97 are held in spaced-apart relationship by a frame structure comprising cross pieces 101 and side pieces 102 as seen in Figure 10. The entire elevator may be supported by a base structure 103, and the chains 93 engage lower sprockets 104 and upper sprockets 105, the upper sprockets being supported by bearings 106 and the lower sprockets by bearings 107. Preferably the conveyor has an individual driving motor and reduction gear 108 on base 103, and, as mentioned previously, the elevator is disposed adjacent ramp 25 which carries the barrels 86 through aperture 24 in wall 22, as seen in Figure 9. Each pair of lifting arms 94 will therefore lift a single barrel as they pass ramp 25, the ramp having a clearance recess (not shown) for the arms, and the next barrel will thereupon roll into lifting position.

Figure 11:
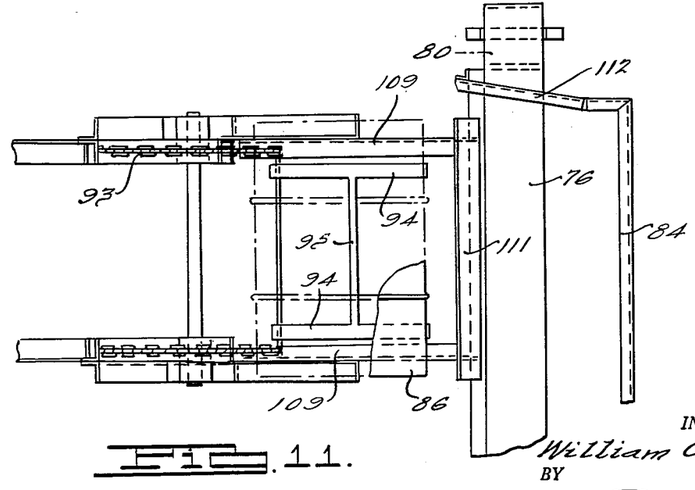
Figure 11 is a plan view showing the roll-off arrangement between the elevator and the feed conveyor.

The transfer means for carrying the barrels from the upper portion of the elevator onto the feed conveyor 27 is best shown in Figures 9 and 11 and comprises a pair of rails 109 extending between the upper end of the elevator and the conveyor, with an inclined roll-off plate 111 secured between the rail ends adjacent belt 76. Preferably a guard rail 112 is disposed adjacent the roll-off plate to prevent unwanted movement of the barrels as they roll onto the belt, this guard rail being contiguous with longitudinal guard rail 84.

Before describing the operation of the storage system it should be pointed out that the functioning of the system depends in no way upon the percentage capacity which is being used at any one time, but that the system will perform its storage functions no matter how few or how many barrels are actually present to be stored. For purposes of description however we will assume that barrels 86 are being continuously delivered by ramp 25 onto elevator 26, by which they are picked up singly on racks 94 and carried upwardly onto the end of feed conveyor 27 by means of rails 109. It will further be assumed that at the beginning of operation the storage racks are entirely empty and that no barrels are required to be removed from the storage racks.

As each barrel lands on belt 76 of the conveyor it will be carried along by the belt and will eventually reach the entrance of the top tier 35 of the first storage rack 21. Assuming that it is desired to place the barrels in this storage rack, the deflector 81 corresponding to this rack will be placed in its inclined position as shown in Figure 13, thus forcing the barrels one by one onto chains 47 of this uppermost tier by means of inclined ramp 87. The chains 47 in all the tiers will be driven continuously, so that when the barrels roll onto the chains of the uppermost tier they will be carried along this tier until they drop off the far end and are carried by curved tracks 53 to the tier 36. The chains of tier 36 are driven in a direction opposite to that of tier 35, so that the barrels will be carried back in the opposite direction, and will eventually drop onto tier 37. This action will continue until the barrels reach the far end of the lowermost tier 39, from where they will roll down inclined discharge section 28 and be stopped by the star wheel or other discharge mechanism 29.

As more and more barrels are fed onto the storage rack they will pile up in the lowermost tier of the rack and then in the succeeding upper tiers, until eventually all five tiers and their connecting portions are solidly filled with the barrels. At this point it should be observed that even though the barrels are stationary in the tiers, the chains 47 may still continue to run, there being little frictional loss because of the smooth-topped nature of the chains. When the first rack 21 has reached its capacity, or before this point if desired, the next succeeding storage rack, or any other rack, may be filled or partially filled with barrels by properly adjusting the deflectors 81. For example, if it is desired to fill the last rack 21, that is the one furthermost along the feed conveyor 27, the deflectors for all the other racks will be moved into their retracted position while that of the last rack is placed in inclined position. In this manner the racks may be filled at a controlled rate, and since the action is positive, each rack may be filled to capacity in all its tiers.

When it is desired to remove a number of barrels from a particular rack, this may be done by operating the corresponding discharge device 29 and ejecting the desired number of barrels through opening 30 in discharge section 28. As the barrels are removed, succeeding barrels will be automatically moved up into unloading position because of the immediate frictional action of belts 47 on the barrels. This "moving-up" action will immediately be effective through all the tiers since each tier has its own pair of chains which may be continuously driven.

It will be observed that, except in a condition where all the storage racks are solidly filled, the rate at which barrels are unloaded from the rack will not affect the rate at which barrels can be stored. Furthermore, it will be noted that the structural arrangement permits the addition or subtraction of rack units or pairs of rack units with little redesign, the primary change being in the length of feed conveyor 27. It would likewise be possible to vary the construction in order to mount the elevator 26 on wheels riding on tracks so that it could be aligned with any one of the individual racks and thus avoid the necessity of using feed conveyor 27. The chain 47 of each tier being driven by its own motor may be operated independently of the other chains, if desired. This is advantageous under some circumstances; for example when no barrels are being withdrawn and the lowest tier or tiers are filled, the chains for the filled tiers may be stopped and the others operated to complete the rack-filling operation. While it would be possible to operate all of the chains simultaneously when loading or unloading operations are being carried on, it is preferred to provide separate control switches for each chain and conveyor motor which may be controlled by conventional push buttons. The switch controls may be located at any convenient control location or may be duplicated at or divided between two control stations, one for loading and the other for unloading. Since no harm results from movement of the chains when the racks are filled and no barrels are being withdrawn, no elaborate safety interlocks are required.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

I claim:

1. In a system for storing barrels, a storage rack including a plurality of vertically spaced horizontal tiers, a bed portion on each of said tiers adapted to simultaneously engage all the barrels on the tier, each of said bed portions including an endless chain having a relatively smooth contacting surface for the barrels, whereby the chain may be continuously driven while the barrels remain stationary, successive chains being movable in opposite directions, supporting members for said tiers holding the tiers in a unitary structure, guard rails along the sides of said tiers and spaced apart a distance slightly greater than the height of said barrels, and arcuate guide means extending between the upper portion of each tier and the bed portion of the tier next below.

2. In a system for storing barrels, a storage rack including a plurality of vertically spaced horizontal tiers, a bed portion on each of said tiers adapted to simultaneously engage all the barrels on the tier, each of said bed portions including an endless chain having a relatively smooth contacting surface for the barrels, whereby the chain may be continuously driven while the barrels remain stationary, successive chains being movable in opposite directions, supporting members for said tiers holding the tiers in a unitary structure, guard rails along the sides of said tiers and spaced apart a distance slightly greater than the height of said barrels, and means extending between one end of each tier and the adjacent end of the tier next below for guiding said barrels.

3. In a system for storing barrels, a storage rack including a plurality of vertically spaced horizontal tiers, a bed portion on each of said tiers adapted to simultaneously engage all the barrels on the tier, each of said bed portions including a pair of endless chains disposed in parallel relation on opposite sides of the center line of the bed portion, said chains comprising the sole supporting means for said barrels and having relatively smooth contacting surfaces for the barrels, whereby the chains may be continuously driven while the barrels remain stationary, chains in successive tiers being movable in opposite directions, supporting members for said tiers holding the tiers in a unitary structure, guard rails along the sides of said tiers and spaced apart a distance slightly greater than the height of said barrels, and arcuate guide means extending between the upper portion of each tier and the bed portion of the tier next below.

4. In a system for storing barrels, a storage rack including a plurality of vertically spaced horizontal tiers, a bed portion on each of said tiers adapted to simultaneously engage all the barrels on the tier, each of said bed portions including a pair of endless looped members disposed in parallel relation on opposite sides of the center line of the bed portion, said looped members comprising the sole supporting means for said barrels and having relatively smooth contacting surfaces for the barrels, whereby the looped members may be continuously driven while the barrels remain stationary, looped members in successive tiers being movable in opposite directions, supporting members for said tiers holding the tiers in a unitary structure, guard rails along the sides of said tiers and spaced apart a distance slightly greater than the height of said barrels, and means extending between one end of each tier and the adjacent end of the tier next below for guiding said barrels.

References Cited in the file of this patent

UNITED STATES PATENTS

| | | |
|---|---|---|
| 230,144 | Merry | July 20, 1880 |
| 392,128 | Meyer | Oct. 30, 1888 |
| 702,408 | Cook | June 17, 1902 |
| 1,357,315 | Dupuy | Nov. 2, 1920 |
| 1,401,372 | Sutherland | Dec. 27, 1921 |
| 1,570,235 | Fooks | Jan. 19, 1926 |
| 1,940,978 | Snow et al. | Dec. 26, 1933 |
| 1,998,912 | Troy | Apr. 23, 1935 |